(No Model.) 2 Sheets—Sheet 1.

A. B. W. H. CORDS.
SHIP'S TELEGRAPH.

No. 481,223. Patented Aug. 23, 1892.

Witnesses:
Wm. Schulz.
A. Jougleman.

Inventor
A. B. W. H. Cords
by his attorneys
Roeder & Briesen (No Model.) 2 Sheets—Sheet 2.
A. B. W. H. CORDS.
SHIP'S TELEGRAPH.
No. 481,223. Patented Aug. 23, 1892.
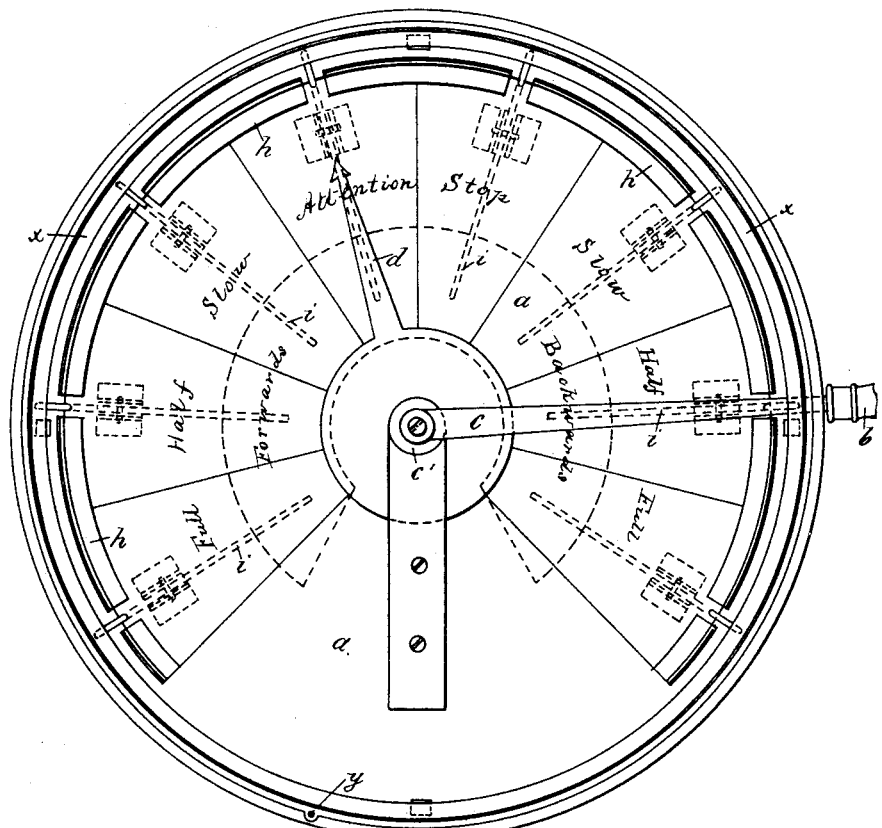
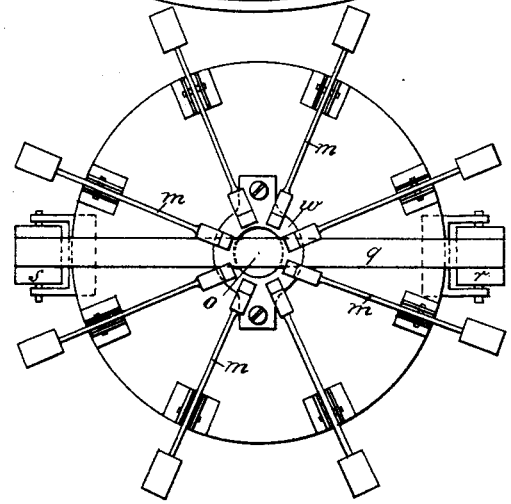

UNITED STATES PATENT OFFICE.

ALBERT BARTHOLD WILHELM HENRY CORDS, OF HAMBURG, GERMANY.

SHIP'S TELEGRAPH.

SPECIFICATION forming part of Letters Patent No. 481,223, dated August 23, 1892.

Application filed January 14, 1892. Serial No. 418,006. (No model.)

*To all whom it may concern:*

Be it known that I, ALBERT BARTHOLD WILHELM HENRY CORDS, a subject of the Emperor of Germany, residing at Hamburg, Germany, have invented new and useful Improvements in Ship-Telegraphs, of which the following is a specification.

Ships' telegraphs as heretofore constructed have the disadvantage that the orders given must be written down by the sender, and also by the person receiving the same, if it be desired that the maneuvers of the ship to which the apparatus is fitted shall be capable of being checked in case of accidents. This method of recording the signals sent and received is, however, not thoroughly trustworthy, as the movements last made are generally not written down at all.

Now this invention has for its object to obviate this disadvantage and to effect in an absolutely accurate and automatic manner the registration of the orders given. The apparatus for effecting this object is illustrated in the accompanying drawings.

Figure 1:
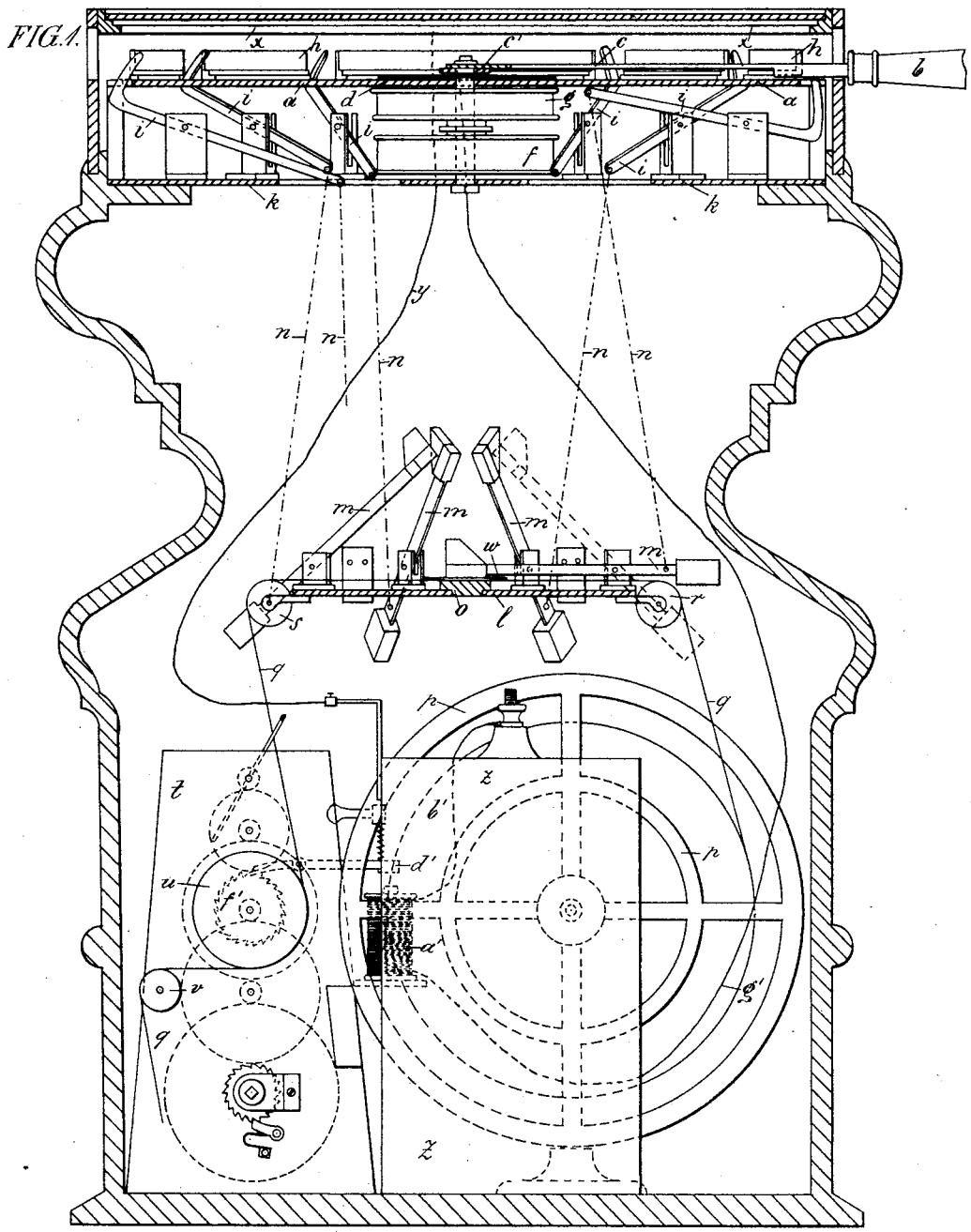
Figure 4:
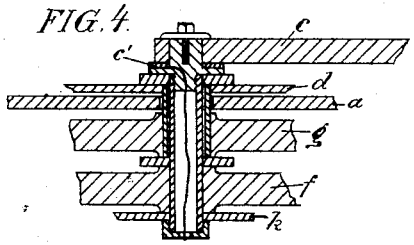

In the drawings, Figure 1 is a vertical section through the center of the apparatus, and Fig. 2 is a plan thereof. Fig. 3 is a plan of the registering mechanism; Fig. 4, a detail section through drums $f\ g$.

The controlling-telegraph consists, in the usual manner, of a disk $a$, on which are marked at determined distances apart the various orders to be given, an operating-lever $c$, provided with a handle $b$, and a hand or pointer $d$, which serves to give the checking or acknowledging indications. The said lever and pointer are arranged to move over the dial $a$. On the hollow spindle of the lever $c$ is fixed a drum $f$, and on the spindle of the pointer $d$, which is also hollow to allow of the passage therethrough of the spindle of the lever $c$, a second drum $g$ is fixed. A corresponding second or receiving dial is provided on the engine or at the wheel, and the spindles of the pointers moving over these receiving-dials are also provided with drums. The drums of the transmitting and receiving dials are connected by cords or chains (omitted for the sake of clearness) in such a manner that the operating-lever of one dial shall always come over the same order as the pointer of the other dial, which gives the acknowledging indication, whichever order may be given. On the dial $a$ is fastened a ring $h$, which is provided with as many notches as there are orders to be given—in the present case eight. These notches are so made that the operating-lever $c$ can enter them. Into each of these notches there projects one end of a two-armed lever $i$, the several levers being mounted on fulcrums carried by a plate $k$, located beneath the dial $a$. The fulcrums of the levers are so arranged that normally the said levers will project into the notches and that only one of them will be pressed down at the time by the operating-lever. This position of the levers may also be insured by means of springs connected to the lower arm of each lever. Corresponding with the levers $i$ is a series of similarly-mounted two-armed levers $m$, carried by a third plate $l$, and so arranged that they normally occupy the inclined position illustrated in Fig. 1. These levers $m$ are connected by cords $n$ with the levers $i$.

On the free arms of the levers $m$ are provided symbols or characters corresponding to the orders to be given. These symbols or characters may consist either of ordinary printing-type characters or, preferably, of fine needle-points arranged so as to constitute specific types. In the center between the levers $m$ is a rubber plate $o$, fixed on the disk $l$ and serving as a support for a strip of paper $q$ coming from the roll of paper $p$. The strip of paper passes from the roll $p$ over two guide-pulleys $r$ and $s$ to a pulley $u$, which is driven by clockwork $t$, and thence over a guide-pulley $v$, whence it passes off either to be coiled up or to fall down loosely near the clockwork. Above the rubber plate $o$ is fixed a perforated plate $w$, under which the strip of paper passes and which serves to prevent the strip from being carried up by either of the levers $m$ when rising.

In order that the strip shall not travel continually, but only when an order is to be given, there is or may be provided an electrical engaging and disengaging device. This device consists of a contact-ring $x$, located above the dial $a$, and connected by a conductor $y$ with a dry cell $z$, and an electro-magnet $a'$, connected by a conductor $b'$ with the dry element $z$, and by a conductor $g'$ with the disk $c'$, which is fixed below the operating-lever $c$ and is constantly in contact therewith. The armature $d'$ of the electro-magnet $a'$ is formed as a detent that engages in a ratchet-wheel $f'$, fixed on the shaft of the pulley $u$, and thus arrests the clockwork so long as the circuit is broken.

The operation of the apparatus is as follows: When an order is to be given, the operating-lever $c$, is lifted out of one of the notches, thereby closing the circuit of the battery, as the lever $c$ will in being raised make contact with the ring $x$. An electric current then passes from the zinc pole of the element $z$ through the conductor $y$, ring $x$, lever $c$, contact-disk $c'$, conductor $g'$, electro-magnet $a'$, conductor $b'$ to the carbon pole of the element. The electro-magnet is consequently energized and attracts its armature $d'$, which then releases the ratchet-wheel $f'$ and permits the clockwork $t$ to set the strip of paper $q$ in motion. At the same time the lever $i$, which had been kept pressed down by the operating-lever $c$, will rise and with it one arm of the lever $m$, connected therewith. When the operating-lever has by partial rotation been brought over the notch which corresponds to the order to be given, it is inserted into the said notch, thereby breaking the electric circuit, arresting the motion of the clockwork, and depressing the corresponding lever $i$. The corresponding lever $m$ then moves with this lever $i$ in such a manner that the character or marking device carried at its free end is struck or pressed upon the strip of paper, and thereby records the nature of the order sent. The apparatus remains in this position until a fresh order is to be given, whereupon the operations just described are repeated.

It will be readily understood that the clockwork may be allowed to run continuously, in which case it is advantageous to employ a strip of paper divided according to periods of time, in order to admit of determining with accuracy at what times orders were given.

The registering mechanism may be employed on sailing ships without alteration for the purpose of registering the orders given to the man at the wheel, it being merely necessary in this case to provide the dial $a$ with the orders for steering, instead of with the orders for controlling the engine, and to provide the levers $m$ with characters or recording devices corresponding to the orders for steering.

What I claim is—

1. The combination of a transmitting-lever $c$, adapted to operate the pointer of the receiving-instrument, with a series of levers $i$, vibrated by lever $c$, and with a set of recording-levers $m$, connected to levers $i$, substantially as specified.

2. The combination of a ship's dial with a notched ring $h$, transmitting-lever $c$, adapted to move over the dial, levers $i$, engaging the notched disk and vibrated by the lever $c$, and with recording-levers $m$, connected to levers $i$, substantially as specified.

3. The combination of a ship's dial with the transmitting-lever $c$, intervening levers $i$, recording-lever $m$, a paper-feeding clockwork having a ratchet-wheel $f'$, a detent armature engaging the same, and with the ring $x$, adapted to make contact with the lever $c$ and to close the circuit for intermittently releasing the clockwork, substantially as specified.

In testimony whereof I have signed my name to this specification in the presence of two subscribing witnesses.

ALBERT BARTHOLD WILHELM HENRY CORDS.

Witnesses:
MAX FOUQUET,
NICOLAS FABRY.